United States Patent
Reed

[19]

[11] Patent Number: 6,155,622

[45] Date of Patent: Dec. 5, 2000

[54] TRUCK BED EXTENSION

[76] Inventor: Harry F. Reed, 101 River Ridge Rd., Cedar Falls, Iowa 50613

[21] Appl. No.: 09/510,040

[22] Filed: Feb. 22, 2000

[51] Int. Cl.[7] .................................................. B62D 33/02
[52] U.S. Cl. ..................................... 296/26.08; 296/57.1
[58] Field of Search ............................. 296/26.08, 26.09, 296/26.1, 26.11, 57.1, 402–405

[56] References Cited

U.S. PATENT DOCUMENTS

| | | | |
|---|---|---|---|
| 4,778,213 | 10/1988 | Palmer | 296/37.6 X |
| 5,658,033 | 8/1997 | Delaune | 296/26.08 |
| 5,755,480 | 5/1998 | Bryan | 296/57.1 X |
| 5,816,637 | 10/1998 | Adams et al. | 296/26.09 |
| 5,820,188 | 10/1998 | Nash | 296/26.11 |
| 5,823,596 | 10/1998 | Kulesza | 296/26.08 |
| 5,997,066 | 12/1999 | Scott | 296/26.08 |

*Primary Examiner*—Dennis H. Pedder
*Attorney, Agent, or Firm*—Jeffrey Weiss; Jeffrey D. Moy; Weiss & Moy, P.C.

[57] ABSTRACT

A truck bed extension is provided for extending the useful length of a pickup truck bed. The truck bed extension includes a pair of transversely spaced sidewalls interconnected by a spacing member, with each sidewall coupled to a downwardly extending mount having an inwardly oriented pin, whereby the pins are substantially opposed and collinear. The pins are positioned for receipt into openings in the tailgate housing latches. When the truck bed extension is lowered, the pins are received into and releasably coupled with the latches. Brackets are preferably provided adjacent the forward margins of the sidewalls and oriented outwardly to receive inwardly extending posts extending inwardly from the bed walls.

19 Claims, 2 Drawing Sheets

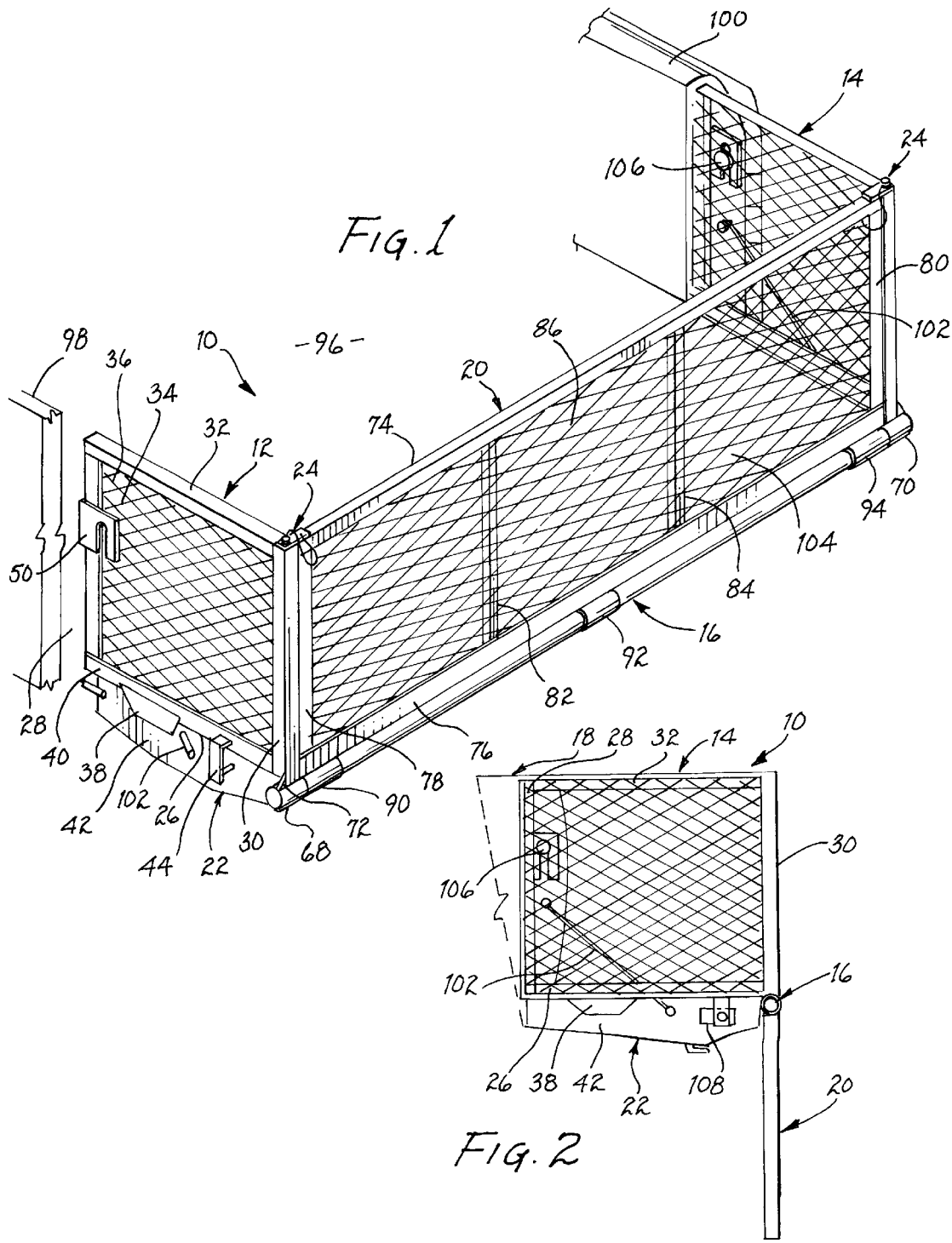

TRUCK BED EXTENSION

BACKGROUND OF THE INVENTION

1. Field of the Invention

This invention broadly concerns a truck bed extension which can be readily mounted and detached from a conventional pickup truck bed. More particularly, it is concerned with a truck bed extension which may be coupled to the truck bed and tailgate for increasing the effective length of the truck bed which attaches to the existing tailgate latching hardware without the need for modification.

2. Description of the Prior Art

Pickup trucks have become a common conveyance for many people in lieu of an automobile. They have the ability to carry cargo and in recent years, many trucks include added passenger seating. In many instances, pickup truck manufacturers wish to avoid increasing either the wheelbase or the overall length of the truck when further seating capacity is added. As a result, the manufacturer often shortens the truck bed of the pickup.

Unfortunately, the result is a reduced cargo-carrying capacity. While traditional pickup truck beds have had a length of about 8 feet in order to carry standard dimensioned lumber and plywood of that length, many current pickup truck bed lengths are reduced to six feet or even four feet. As a consequence, many articles can no longer be successfully transported in the shortened bed.

Several attempts have been made to develop a suitable truck bed extender, and are shown for example in U.S. Pat. Nos. 5,658,033; 5,755,480; 5,816,637 and 5,820,188. However, a problem common to the teaching of each of these designs is their inability to be mounted and readily detached from standard pickup truck beds having latching assemblies, and may require the truck bed to be modified from its existing structure. This detracts from the use of the truck in its manufactured state when no extension is desired. Furthermore, prior art designs lack the combination of secure attachment to both the bed and the tailgate with the need for one-person attachment without the use of tools.

There has thus developed a need for a pickup truck bed extension which can be readily mounted and detached from the bed of a pickup having conventional latching mechanisms. There has further developed a need for a pickup truck bed extension which requires no modification of the truck bed itself, and thus can be used by a pickup truck owner who either lacks the desire or the skills necessary to alter the truck as provided by the manufacturer.

SUMMARY OF THE INVENTION

These and other objects have been largely met by the truck bed extension of the present invention. That is to say, the truck bed extension hereof can be securely coupled to the existing latching mechanism of a pickup truck bed and tailgate, requires no additional tools, is relatively light in weight and easy to handle, and can be readily mounted and detached without altering the configuration provided by the manufacturer.

The truck bed extension hereof is particularly designed to be mounted on a pickup truck bed having a deck and upright bed walls. The bed walls include upright end portions at the rear thereof, each end portion mounting opposed, inwardly extending generally horizontal posts. In addition, the tailgate is provided with releasable latches on each side thereof. Thus, in ordinary operation, the tailgate swings on a generally horizontal axis and when upright, the latch mechanisms at each side thereof receive the posts on the bed and hold the tailgate in an upright, closed position. By actuating a handle operatively coupled to the latching mechanisms in the tailgate, the tailgate is released and may be swung downwardly to a generally horizontal orientation, supported by a cable or linkage.

By taking advantage of this relationship, the truck bed extender hereof accomplishes the purposes set forth above. The extender includes a pair of laterally spaced, generally upright sidewalls and a transverse spacing element coupled therebetween. The sidewalls include lower rails which are provided with pins which are positioned and configured for insertion into the latching mechanisms. The pins are positioned on the lower rails so that upright pillars on the sidewalls are adjacent the upright rear portions of the pickup truck bed. U-shaped brackets are positioned on the pillars to receive posts mounted on the standards by the manufacturer. The brackets and the pins effectively lock the truck bed extension in place and resist movement thereof in each of three orthogonal axes. The truck bed extension may be quickly removed simply by actuating the handle on the tailgate of the pickup to release the pins and then lifting the brackets off of the posts extending inwardly from the bed. The truck bed extension preferably hingeably mounts a rear gate, and the extension may have either solid upright walls or mesh walls, using the tailgate itself as the floor of the extension.

These and other advantages will be readily apparent to those skilled in the art with reference to the drawings and the description which follows.

BRIEF DESCRIPTION OF THE DRAWINGS

FIG. 1 is a perspective view of the truck bed extension hereof shown mounted to the bed of a pickup truck, the truck bed being shown as a fragmentary diagrammatic view;

FIG. 2 is a side elevational view showing the truck bed and tailgate to which the truck bed extension is mounted;

DESCRIPTION OF THE PREFERRED EMBODIMENT

Figure 3:
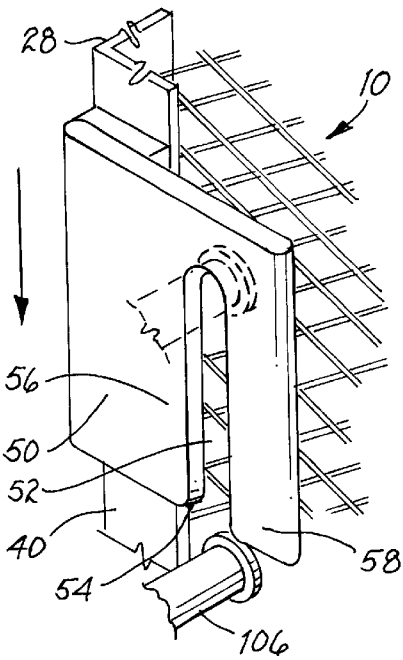
FIG. 3 is an enlarged, fragmentary perspective view showing the mounting bracket on the truck bed extension receiving a post which extends inwardly from the bed wall of the truck.
Figure 4:
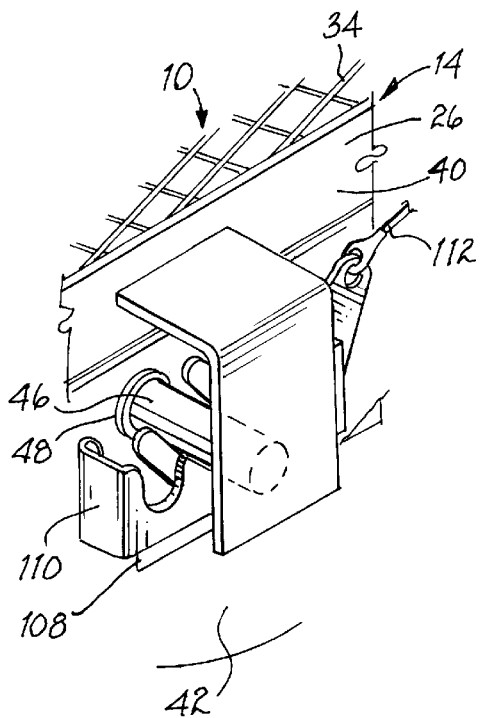
FIG. 4 is an enlarged, fragmentary perspective view showing the pin extending inwardly from a mount which extends downwardly from the lower side rail of the truck bed extension sidewalls.
Figure 5:
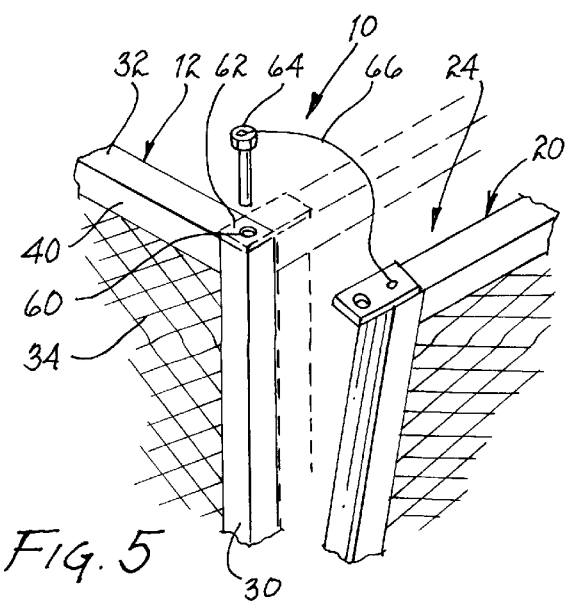
FIG. 5 is an enlarged, fragmentary perspective view showing the rear gate of the truck bed extension and the fastening member for holding it in position.

Referring now to the drawing, a truck bed extension 10 in accordance with the present invention broadly includes first and second generally upright sidewalls 12 and 14 which are spaced in parallel planes and connected by a bar 16 which transversely spaces the sidewalls 12 and 14 to lie in generally parallel planes extending rearwardly from a truck bed 18 of a pickup truck. The bar 16 also pivotally mounts a rear gate 20, the bar 16 being positioned to lie preferably rearwardly of the tailgate 22 of the pickup so that the rear gate 20 is free to swing downwardly below the bar 16 without interference from the tailgate 22. A fastening member 24 is provided on the rear gate 20 to releasably couple it to the sidewalls and hold it in a closed, upright position between the sidewalls 12 and 14.

In greater detail, the sidewalls 12 and 14 each include a lower side rail 26 defining a lower sidewall margin, an upright front pillar 28 defining a front sidewall margin, an upright rear pillar 30 defining a rear sidewall margin, an upper side rail 32 defining an upper sidewall margin, and side enclosure 34 to enclose the area within the pillars and the rails of each sidewall 12 and 14. The pillars 28 and 30 and the side rails 26 and 32 are preferably provided of tubular steel or aluminum for light weight, ruggedness of construction and the ability to interconnect by welding. Preferably, the pillars and rails will be welded together at their ends, with the enclosure welded thereon to provide a rigid sidewall. The enclosure 34 may be of expanded metal mesh 36, as shown, or alternatively of sheet metal. The sidewalls each have an outboard side 40. The lower side rail 26 includes a guide flange 38 extending downwardly from the outboard side 40 of each of the lower side rails 26 to engage the sides 42 of the tailgate 22 and resist lateral movement of the truck bed extension 10. Additionally, the lower side rails 26 each carry a downwardly extending L-shaped mount 44 which include an inwardly extending pin 46. Thus, the pin 46 of sidewall 12 will be opposite and extend toward the pin 46 of sidewall 14, and the pin 46 of sidewall 14 will be opposite and extend toward the pin 46 of sidewall 12. The pins 46 of each sidewall 12 and 14 thus are substantially co-linear and lie in a substantially horizontal plane when the truck bed extension is mounted, each pin 46 including a terminal flange 48 to aid in preventing slippage of the pin 46 when mounted to the tailgate 22.

The front pillars 28 of each sidewall 12 and 14 include a U-shaped side bracket 50 on the outboard side 40 thereof. The brackets 50 thus present a slot 52 open at its lower end 54, with the brackets 50 on each sidewall 12 and 14 being positioned to lie in the same, substantially horizontal plane. The brackets 50 thus include a front leg 56 and a rear leg 58 which inhibit front and rear movement of the truck bed extension 10 when mounted.

The rear pillars 30 of each sidewall 12 and 14 include a hole 60 in the upper end 62 thereof. The fastening member 24 includes a pin-like bolt 64 attached by a wire 66 to the rear gate 20, with the bolt 64 removably received in the hole 60 to hold the rear gate 20 in a closed position. A mounting bracket is attached to the rear gate 20 and provided with an aperture which is in registry with the hole 60 when the rear gate 20 is in an upright, closed position, whereby bolt 64 may secure the mounting bracket to the rear pillars of the respective sidewalls.

The bar 16 is preferably a tubular steel cylinder having a circular outer surface with end caps 68 and 70 welded thereto. A gusset plate 72 is welded to each cap and its corresponding rear pillar 30 to provide additional reinforcement and rigidity and to maintain the sidewalls 12 and 14 in an upright orientation.

The rear gate 20 includes upper beam 74 and lower beam 76 positioned in spaced-apart, substantially parallel planes. The beams 74 and 76 are interconnected by side stanchions 78 and 80 respectively adjacent the side walls 12 and 14, and optional additional support is provided by intermediate braces 82 and 84. The beams 74 and 76 are welded to the side stanchions 78 and 80 and also to the braces 82 and 84, with a back enclosure 86 provided to inhibit material received in the truck bed from passing rearwardly therepast. To minimize air resistance when the truck is in motion, the back enclosure 86 may be of expanded metal mesh 36 as shown, but alternatively the back enclosure may be provided as a sheet metal panel. The rear gate 20 is preferably swingably mounted to the bar 16 by circular bearings 90, 92 and 94 which are welded onto the lower beam 76 at laterally spaced intervals.

The truck bed extension 10 hereof is especially designed to be mounted to a pickup truck bed 18 having a generally horizontal deck 96 and a pair of spaced apart bed walls 98 and 100. The bed 18 includes hinges which swingably mount the tailgate 22 for movement about a generally horizontal axis. At least one of the bed walls 98 and 100 are typically connected to the tailgate 22 by a retainer, such as a cable 102 or arm, which maintains the tailgate 22 in a generally horizontal position when opened as shown in FIG. 2. In this position, the interior wall 104 of the tailgate 22 is substantially co-planar with the deck 96 of the truck bed.

The bed walls 98 and 100 each include, at a predetermined location on the rear portions thereof, opposed, inwardly extending posts 106, preferably with terminal flanges. The posts 106 are sized, configured and located to slide into openings 108 in respective sides of the tailgate 22, the openings 108 each having latches 110 positioned therein to receive the posts 106 when the tailgate 22 is closed by swinging it into a generally vertical position. The latches 110 are thus positioned at a predetermined position on the tailgate to cooperate with the posts 106. The tailgate 22 is typically provided with a shiftable handle which is operatively coupled to the latches 110 by an arm, cable 1 12 or the like. Thus, the user lifts or otherwise shifts the handle to open the latches 110 which permits opening of the tailgate 22.

The truck bed extension 10 hereof advantageously positions the brackets 50 and the pins 46 to hold the extension onto the truck bed. The brackets 50 are positioned on the front pillars 28 so that the lower side rails are proximate to or supported by the tailgate 22, the posts 106 received in the slots 52, and the pins 46 releasably coupled to the latches 110. In this position, the bar 16 is positioned just rearwardly and below the interior wall 104 of the tailgate 22. In this position, with the rear gate swung downwardly in an open position, cargo received on the deck 96 of the truck bed can slide rearwardly across the tailgate 22 without interference by the bar 16. Additionally, the sidewalls 12 and 14 extend rearwardly from the recessed rear portions of the truck bed 18 and in overlapping relationship, the front pillars 28 essentially occupying the space within the recessed rear portions of the truck bed where the tailgate 22 originally connected to the bed walls 98 and 100. The attachment of the truck bed extension 10 is simplified by the fact that only vertical movement of the extension 10 onto the truck bed 18 is required. With the tailgate 22 open to serve as the floor of the extension 10, lowering of the brackets 50 onto the posts 106 while the pins 46 and lowered and locked onto the latches 110 completes the mounting operation. Removal of the extension 10 requires only that the handle on the tailgate 22 be pulled to cause the cable 112 or the like to trip the latch release lever and thereby permit the spring loaded receiver to pivot, thereby opening the latches to free the pins 46 and enable lifting of the extension in a vertical direction. This can be accomplished by one person when a hoist or pulley system is attached to the extension as an aid to raising and lowering.

When mounted to the truck bed 18, the sidewalls 12 and 14 extend rearwardly and lie in substantially the same upright parallel planes as the bed walls 98 and 100. Thus, without the necessity of additional fittings or hardware being permanently coupled to the truck bed 18, its length can be functionally extending for temporary periods, with the advantage that it can be quickly returned to its original condition without any holes or permanent modifications.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the rear gate could be mounted to swing horizontally instead of vertically, the fastening member could be a clasp or padlock, and the side walls and rear gate could be molded of synthetic resin, glass reinforced resin, carbon fiber or other lightweight and rigid materials.

The inventors hereby states his intent to rely on the Doctrine of Equivalents to determine and assess the reasonably fair scope of his invention as pertains to any apparatus not materially departing from but outside the literal scope of the invention as set out in the following claims.

What is claimed is:

1. A truck bed extension for mounting to a pickup truck comprising;
    first and second substantially upright longitudinally extending sidewalls each having a forward margin and a lower margin;
    a transversely extending member interconnecting and transversely spacing said sidewalls;
    a downwardly extending mount coupled to each of said first and second sidewalls and positioned to extend below said lower margin, each of said mounts including a pin oriented toward the other of said sidewalls.

2. A truck bed extension as set forth in claim 1, wherein said pin on the mount coupled to said first sidewall and said pin on the mount coupled to said second sidewall are opposed and extend toward each other and are substantially co-linear.

3. A truck bed extension as set forth in claim 2, wherein said first and second walls each have an outside surface, and including a substantially U shaped bracket mounted on the outside surface of each of said first and second sidewalls proximate the forward margin thereof.

4. A truck bed extension as set forth in claim 3, wherein said U shaped bracket presents a slot therein which is open at its lower end.

5. A truck bed extension as set forth in claim 4, said sidewalls each including an upper rail, a lower rail defining said lower margin, a front pillar defining said front margin, a rear pillar, and an enclosure member substantially extending between said pillars and between said rails.

6. A truck bed extension as set forth in claim 5, wherein said transversely extending member includes a substantially circular bar.

7. A truck bed extension as set forth in claim 6, including a rear gate swingably mounted to said bar for movement between a generally upright, closed position and a downward, open position.

8. A truck bed extension as set forth in claim 7, including a fastening member for releasably securing the rear gate in an upright position.

9. A truck bed extension as set forth in claim 1, wherein said mounts each comprise an L shaped bracket mounting said pins in opposing orientation.

10. In combination:
    a truck including a truck bed having a pair of substantially upright, longitudinally extending, spaced apart bed walls and a substantially horizontal deck extending therebetween, and a tailgate swingably mounted to said truck bed for movement between a generally upright, closed position and a generally horizontal open position, said bed walls each including a respective inwardly extending post positioned on said bed vertically above the deck, said posts being substantially co-linear and opposed to one another, said tailgate having opposite sidewalls each including a latch sized and configured to releasably couple to a respective post when said tailgate is in the closed position; and
    a truck bed extension releasably coupled to said truck bed and said tailgate, said truck bed extension including first and second spaced apart, generally upright sidewalls positioned to extend rearwardly from said bed walls and a transversely extending member interconnecting and transversely spacing said first and second sidewalls, each of said sidewalls including a mount carrying an inwardly extending pin positioned generally below said sidewall and positioned for receipt by a respective latch on said tailgate when said tailgate is in an open position.

11. A truck bed extension as set forth in claim 10, wherein said pin on the mount coupled to said first sidewall and said pin on the mount coupled to said second sidewall are opposed and extend toward each other and are substantially co-linear.

12. A truck bed extension as set forth in claim 11, wherein said first and second walls each have an outside surface, and including a substantially U shaped bracket mounted on the outside surface of each of said first and second sidewalls proximate the forward margin thereof positioned and configured for coupling to a respective one of said posts.

13. A truck bed extension as set forth in claim 12, wherein said U shaped bracket presents a slot therein which is open at its lower end.

14. A truck bed extension as set forth in claim 13, said sidewalls each including an upper rail, a lower rail defining said lower margin, a front pillar defining said front margin, a rear pillar, and an enclosure member substantially extending between said pillars and between said rails.

15. A truck bed extension as set forth in claim 14, wherein said transversely extending member includes a substantially circular bar.

16. A truck bed extension as set forth in claim 15, including a rear gate swingably mounted to said bar for movement between a generally upright, closed position and a downward, open position.

17. A truck bed extension as set forth in claim 16, including a fastening member for releasably securing the rear gate in an upright position.

18. A truck bed extension as set forth in claim 10, wherein said mounts each comprise an L shaped bracket mounting said pins in opposing orientation.

19. A method of extending and enclosing a truck bed of a truck having a tailgate swingably coupled to the truck bed for movement between an upright closed position and a generally horizontal open position, the truck bed including a pair of upright bed walls and a generally horizontal deck extending therebetween, the tailgate including respective tailgate sides each having an actuatable latch thereon, said method including the steps of:
    providing a truck bed extension having first and second generally upright sidewalls, and a transverse member interconnecting and transversely spacing said sidewalls, and further including a downwardly extending mount coupled to extend below the bottom of a respective one of each of said sidewalls, said mount including an inwardly extending pin complementally configured for receipt in said latch; and
    lowering said truck bed extension into a position wherein said sidewalls extend generally rearwardly of said bed walls, said tailgate is positioned between said sidewalls, and the pin on each of said mounts is releasably coupled to a respective one of said latches on said tailgate.

* * * * *